US010244048B2

(12) United States Patent
Hodges et al.

(10) Patent No.: US 10,244,048 B2
(45) Date of Patent: Mar. 26, 2019

(54) SENDER SYSTEM STATUS-AWARE LOAD BALANCING

(71) Applicant: INTERNATIONAL BUSINESS MACHINES CORPORATION, Armonk, NY (US)

(72) Inventors: Robert D. Hodges, Cary, NC (US); Peeyush Jaiswal, Boca Raton, FL (US); Priyansh Jaiswal, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 15/581,119

(22) Filed: Apr. 28, 2017

(65) Prior Publication Data

US 2018/0316752 A1 Nov. 1, 2018

(51) Int. Cl.
*H04L 29/08* (2006.01)
(52) U.S. Cl.
CPC .............................. *H04L 67/1023* (2013.01)
(58) Field of Classification Search
CPC . H04L 67/1004; H04L 67/1023; H04L 67/10; H04L 67/1002; H04L 67/1008; H04L 67/101; H04L 67/1012; H04L 47/125; G06F 9/505
USPC .................................................. 709/226–227
See application file for complete search history.

(56) References Cited

U.S. PATENT DOCUMENTS 8,244,864 B1    8/2012  Bahl et al.
8,484,374 B2 *  7/2013  Zisapel ................... G06F 9/505
                                                        709/238
9,055,076 B1 *  6/2015  Sorenson, III ...... H04L 67/1008
9,577,940 B2 *  2/2017  Childress .............. H04L 47/125
2006/0136597 A1* 6/2006 Shabtai ............. H04L 29/06027
                                                        709/231

(Continued)

FOREIGN PATENT DOCUMENTS

WO    WO-2008080337 A1 *  7/2008  ........... H04Q 3/0091

OTHER PUBLICATIONS

Mel et al., "The NIST Definition of Cloud Computing," National Institute of Standards and Technology, Information Technology Laboratory, Special Publication 800-145, Sep. 2011, (pp. 1-7).
International Business Machines Corporation (IBM), "z/Architecture Principles of Operation," IBM® Publication No. SA22-7832-10, Eleventh Edition, Mar. 2015, pp. 1-1732.

(Continued)

*Primary Examiner* — Alina A Boutah
(74) *Attorney, Agent, or Firm* — David Woycechowsky, Esq.; Kevin P. Radigan, Esq.; Heslin Rothenberg Farley & Mesiti P.C.

(57) ABSTRACT

Workload processing is facilitated in a data processing environment including a sender system, a load balancer and a plurality of target resources. The sender system sends workloads to the load balancer, and the load balancer distributes the workloads to the plurality of target resources for processing. Facilitating workload processing includes receiving, by the load balancer, sender status-related information which is indicative of a workload capacity issue from the sender system's view related, at least in part, to the sending of the workloads to the load balancer. The load balancer distributes one or more workloads of the sender system to one or more target resources of the plurality of target resources in a manner based, at least in part, upon the received sender status-related information.

18 Claims, 8 Drawing Sheets

(56) References Cited

U.S. PATENT DOCUMENTS

| | | | |
|---|---|---|---|
| 2006/0209688 A1* | 9/2006 | Tsuge | H04L 45/00 370/229 |
| 2011/0141877 A1* | 6/2011 | Xu | H04L 45/24 370/216 |
| 2013/0007109 A1* | 1/2013 | Matsuhira | H04L 67/1002 709/203 |
| 2015/0365328 A1* | 12/2015 | Luke | H04L 47/125 370/238 |
| 2016/0112910 A1* | 4/2016 | Agiwal | H04W 76/14 370/331 |
| 2016/0173582 A1* | 6/2016 | Fitzpatrick | H04L 67/1008 709/226 |
| 2016/0198365 A1 | 7/2016 | Rajagopalan et al. | |
| 2016/0261463 A1 | 9/2016 | Delima et al. | |
| 2016/0330275 A1 | 11/2016 | Mason et al. | |
| 2017/0295101 A1* | 10/2017 | Hira | H04L 43/0876 |
| 2018/0167453 A1* | 6/2018 | Luo | H04L 41/5058 |

OTHER PUBLICATIONS

International Business Machines Corporation (IBM), "Power ISA™ Version 2.07B," International Business Machines Corporation, Apr. 9, 2015, pp. 1-1527.

* cited by examiner

SENDER SYSTEM STATUS-AWARE LOAD BALANCING

BACKGROUND

Data processing environments often provide multiple resources, such as servers, to handle certain workloads. For example, a popular website or service may be supported by multiple webservers so that requests for the site or service from numerous browsers can be handled efficiently and without unacceptable delays.

The technique for distributing competing or similar workloads across a pool of similar or analogous resources is called load balancing. A load balancer is an application or a component that implements load balancing for a given pool of target resources. Data processing systems and applications are examples of resources, whose multiple instances can be pooled and managed by a load balancer. Requests, data transmissions, and job submissions directed towards such data processing systems or application instances are examples of workloads that a load balancer can direct or manage for the resource pool.

Many different types of algorithms are presently available for load balancing. A load balancer executes a load balancing algorithm to select an instance of a pooled resource to which a given workload should be directed. For example, a random selection algorithm randomly selects any of the instances of the pooled resource and directs the workload at hand to that randomly selected resource instance. As another example, a round-robin algorithm sequences the resources in a pool, and progressively selects the next resource instance in the sequence to handle each subsequent workload.

As another example, a weighted round-robin algorithm implements the round-robin method, and further takes into consideration an amount of load a sequenced resource instance can handle to select an appropriate resource instance in the sequence. For example, if a server in the pool can handle twice the load of another server in the pool, the weighted round-robin algorithm counts the larger server twice in the sequence and the smaller server once, so that the larger server can receive twice the workload, which the larger server can handle.

As another example, a fastest response load balancing algorithm selects the response instance from the pool which can respond to the workload the fastest at a given time. For example, some servers in a given pool may be more congested, utilized beyond a threshold, or have a comparatively lower throughput as compared to another server in the pool. The fastest response algorithm selects a resource with these and other similar considerations to provide the fastest response time for a given workload at a given time with a given pool of resources.

SUMMARY

Certain shortcomings of the prior art are overcome and advantages are provided through the provision of a computer-implemented method which includes facilitating workload processing in a data processing environment including a sender system, a load balancer and a plurality of target resources. The sender system sends workloads to the load balancer and the load balancer distributes the workloads to the plurality of target resources for processing. The facilitating workload processing includes receiving, by the load balancer, sender status-related information indicative of a workload capacity issue from the sender system's view related, at least in part, to the sending of the workloads to the load balancer. Further, the facilitating workload processing includes distributing, by the workload balancer, one or more workloads of the sender system workloads to one or more target resources of the plurality of target resources in a manner based, at least in part, upon the received workload status-related information.

In one or more other aspects, a computer-implemented method is provided which includes facilitating workload processing in a data processing environment that includes a sender system, a load balancer and a plurality of target resources. The sender system sends workloads to the load balancer and the load balancer distributes the workloads to the target resources. The facilitating workload processing includes defining an initial plurality of target resources available for processing the workloads, and determining, by machine logic, that a capacity condition exists at the sender system. Responsive to the determination of the capacity condition at the sender system, the method includes selecting by the machine logic an additional target resource from a plurality of additional target resources, with each additional target resource respectively having an associated delay characteristic from the sender system, and the selection being based, at least in part, upon the respective delay characteristic of the additional target resource.

System and computer program products relating to one or more aspects are also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
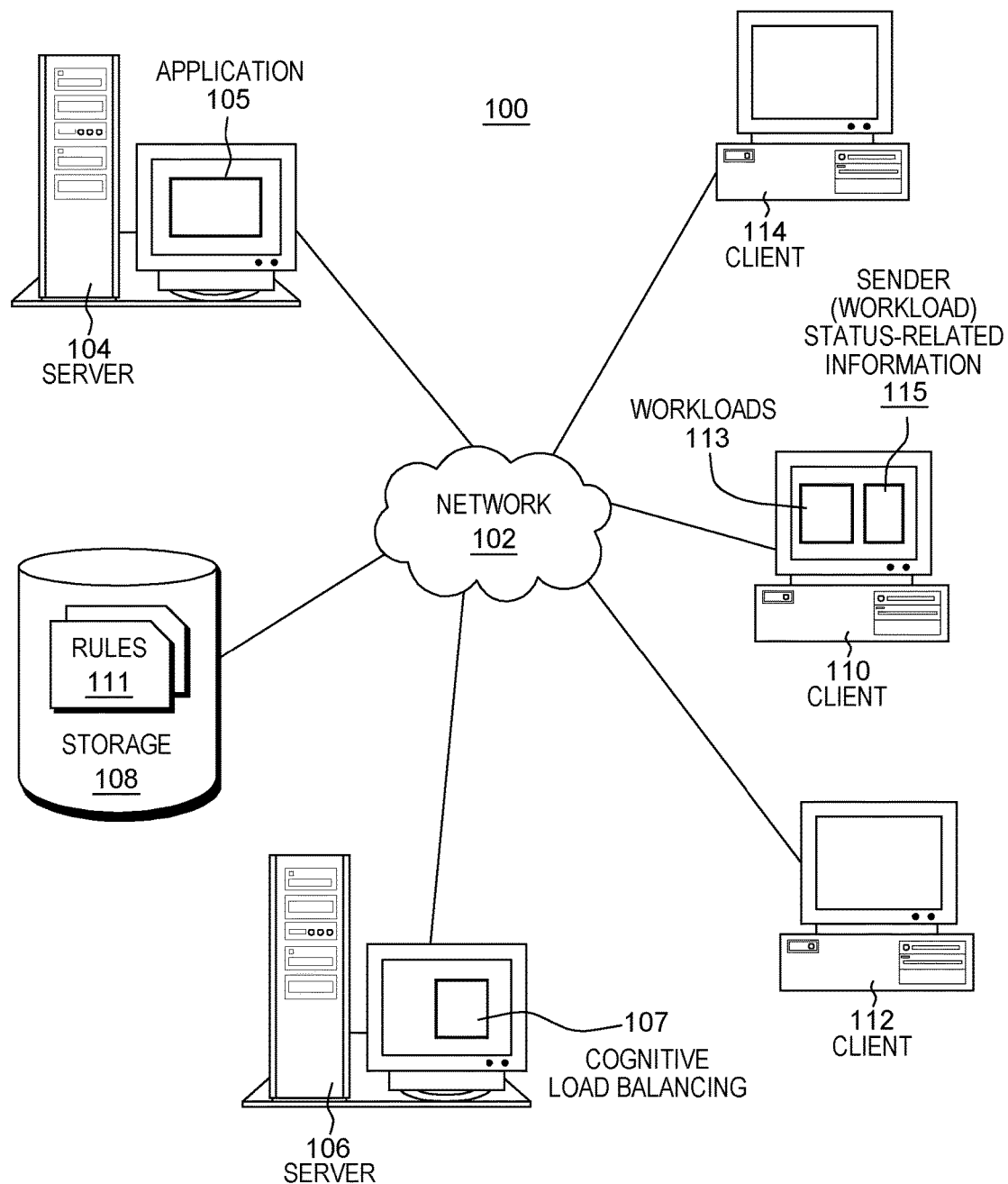
FIG. 1 depicts one embodiment of a data processing environment which may implement sender system status-aware load balancing, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, for facilitating workload processing in a data processing environment, including a sender system, a load balancer and target resources. In one or more implementations, the facilitating workload processing includes using sender status-related information.

Within the scope of this disclosure, a workload within a data processing environment represents work to be performed. The workload, or load, may be digitally sent via a packet, a job submission, a request of any suitable kind, or information thereof, etc., that is directed towards a resource for processing. Furthermore, the directing of the workload, from a sender to the resource, can be with or without the awareness of the pooled nature of the resource or the presence of a load balancer, such as a cognitive load balancer disclosed herein.

In computing, load balancing enhances distribution of workloads across multiple computing resources, such as computers, clusters of computers, network links, central processing units, disc drives, etc. The load balancing is to optimize resource use, which enhances throughput and minimizes response time by, for instance, avoiding overloading of any single resource. Further, by using multiple components with load balancing rather than a single resource, reliability and availability of the processing environment is increased through redundancy. In one or more implementations, load balancing may be implemented through, for instance, dedicated software or hardware, such as a multi-layer switch or a Domain Name System server process. There are a variety of load balancing methodologies currently available. These include, for instance, round robin load balancing, service aware load balancing, load aware load balancing, and auto-scale load balancing.

A round robin load balancer is well used in the art. In a round robin approach, sources (i.e., senders) connect to the load balancer and are vectored (or redirected) to targets based on a simple round robin approach. For instance, send workload first to target resource 1, then target resource 2, then target resource 3, etc.

In a service aware load balancer, sources connect to the load balancer and are vectored (or redirected) to targets based on the services needed (e.g., database, computation, etc.). The load balancer in this approach is aware of what each target resource does, and vectors the sources to the appropriate target.

In a load aware load balancer approach, sources connect to the load balancer and are vectored (or redirected) to targets based on the computational load on the target resource. For instance, the load balancer will send a workload to the least likely loaded target resource using this approach.

The auto-scale load balancer again has sources connected to the load balancer which are vectored (or redirected) to targets, in this case based on the computational load on the target resource. Depending on the workload, the load balancer can request additional target resources be provisioned (e.g., initiated) and made available where the workload requires additional resources.

Notwithstanding the variety of load balancing methodologies available, issues remain in optimizing workload processing in a data processing environment. For instance, the illustrative embodiments presented herein recognize that the typical load balancing methodologies only consider a state or condition of a resource to select that resource from the pool for handling a workload. The illustrative embodiments further recognize that the conventional load balancing methodologies, techniques, and algorithms do not base the load balancing determination on information from the sender of the workload that is directed to the pooled resource.

The illustrative embodiments presented also recognize that regardless of the load balancing algorithm chosen to finally direct or forward workload to an instance of a pooled resource, information about the health of the sender of the workload is also useful in the load balancing exercise and the resulting user (sender system) experience. The illustrative embodiments recognize that depending upon the health of the sender system (e.g., users, sources), the load balancing approach and the pool of participating resource instances, or both, could change.

The illustrative embodiments also recognize that it would be advantageous, for example, to select the pool or sub-pool of resource instances according to the sender's workload status. The illustrative embodiments further recognize that it would be advantageous, for example, to select or change a load-balancing approach for the pool or sub-pool of resources, according to the sender's workload status information (i.e., sender status-related information).

The illustrative embodiments used to describe the invention generally address and solve the above-described problems and other problems related to load balancing. Generally, the illustrative embodiments provide methods, systems, and computer program products for sender system status-aware load balancing.

Note that the illustrative embodiments may be described herein with respect to certain load balancing operations, packets, requests, roles, sender status, rules, policies, algorithms, forms of data, data processing systems, environments, components, and/or applications, which are only presented as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of workload, data source, or access to a data source over a data network. Any type of data storage device may provide the data or workload to an embodiment of the invention, either locally at a data processing system or over a data network, within the scope of the invention.

The illustrative embodiments may be described using specific code, designs, architectures, protocols, layouts, schematics, or tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Figure 2:
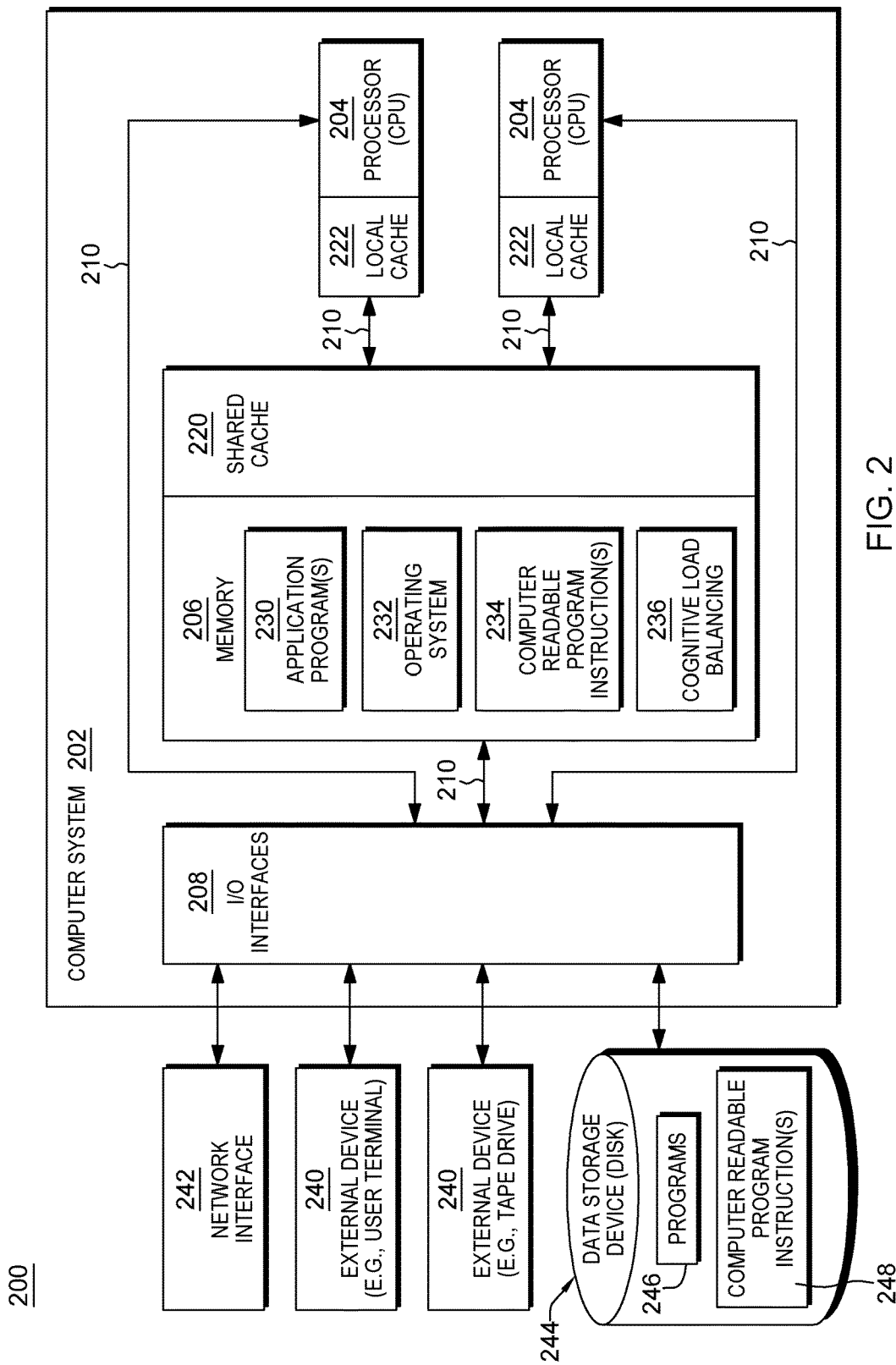
FIG. 2 depicts a block diagram of a data processing system which may implement one or more aspects of sender system status-aware load balancing, in accordance with one or more aspects of the present invention.

With reference to the figures, and in particular with reference to FIGS. 1 and 2, example diagrams are shown of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a data processing environment with a network of data processing systems, in which illustrative embodiments of the present invention may be implemented. In particular, data processing environment 100 may be a network of computers in which one or more illustrative embodiments may be implemented. Data processing environment 100 includes a network 102, which may be the medium used to provide communications links between various devices and computers connected together within data processing environment 100. Network 102 may include connections, such as wired, wireless communication links, fiber optic cables, etc. Server 104 and server 106 are example servers coupled to network 102, along with a storage unit 108. Software applications may execute on any computer in data processing environment 100.

In addition, one or more clients 110, 112, and 114 may couple to network 102. A data processing system, such as server 104 or 106, or client 110, 112, or 114 may contain data and may have software applications or software tools executing thereon.

As an example only, and without any limitation, FIG. 1 depicts certain components that may be usable in one or more embodiments of the present invention. For example, an application 105 in server 104 may facilitate implementing an embodiment described herein, along with cognitive load balancing 107 in server 106, which may implement a sender status-aware load balancing application, process or component to be used within or in conjunction with application 105 as described herein. One or more algorithms accessible from server 106 include one or more algorithms for load balancing as described herein. Rules 111 in storage 108 may be rules for performing sender-status-based selections and operations as described herein. Workload 113 in client 110 is an example of a workload that can be directed by cognitive load balancing 107 to a pooled resource in data processing environment 100. Sender (workload) status-related information (e.g., sender status attribute(s)) 115 in client 110 can be any suitable status attribute of the sender related to processing of the workloads 113. As an example, certain data processing systems connected via network 102, including but not limited to servers 104 and 106 in some cases, may form a pool of computing resources (also referred to herein as the target resources).

As noted, servers 104 and 106, storage unit 108, and clients 110, 112, and 114 may couple to network 102 using wired connections, wireless communication protocols, or other suitable data connectivity. Clients 110, 112, and 114 may be, for example, personal computers, network computers, mobile devices, etc.

In the depicted example, server 104 may provide data, such as boot files, operating system images and applications to clients 110, 112, and 114. Clients 110, 112, and 114 may be clients to server 104 in one example. Alternatively, clients 110, 112, 114, or some combination thereof, may include their own data, boot files, operating system images, and applications. Data processing environment 100 may include additional servers, clients, and other devices that are not shown.

In the depicted example, data processing environment 100 may be or include the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as any of a number of different types of networks, such as for example, an intranet, a local area network (LAN), or a wide area network (WAN), etc. FIG. 1 is intended as an example, and not as an architectural limitation for the different illustrative embodiments.

Among other uses, data processing environment 100 may be used for implementing a client-server environment in which one or more illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which one or more aspects of the present invention may be implemented. Data processing system 200 is an example of a computer, such as server 104 or client 110 in FIG. 1, or another type of device in which computer usable program code or instructions implementing one or more processes may be located for the illustrative embodiments.

In one example, data processing system 200 may be based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the processing system may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The data processing system may also be based on other architectures, including, but not limited to, the Intel x86 architectures. Other examples also exist.

As shown in FIG. 2, data processing system 200 includes, for instance, a computer system 202 shown, e.g., in the form of a general-purpose computing device. Computer system 202 may include, but is not limited to, one or more processors or processing units 204 (e.g., central processing units (CPUs)), a memory 206 (referred to as main memory or storage, as examples), and one or more input/output (I/O) interfaces 208, coupled to one another via one or more buses and/or other connections 210.

Processor 204 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 210 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 206 may include, for instance, a cache 220, such as a shared cache, which may be coupled to local caches 222 of processors 204. Further, memory 206 may include one or more programs or applications 230, an operating system 232, and one or more computer readable program instructions 234, as well as cognitive load balancing logic 236 such as disclosed herein. Additionally, or alternatively (e.g., where computer system 202 is a sender system) computer readable program instructions 234 may be configured to carry out one or more other functions of certain embodiments of the invention.

Computer system 202 may also communicate via, e.g., I/O interfaces 208 with one or more external devices 240, one or more network interfaces 242, and/or one or more data storage devices 244. Example external devices include a user terminal, a tape drive, a pointing device, a display, etc. Network interface 242 enables computer system 202 to communicate with one or more networks, such as a local area network (LAN), a general wide area network (WAN), and/or a public network (e.g., the Internet), providing communication with other computing devices or systems.

Data storage device 244 may store one or more programs 246, one or more computer readable program instructions 248, and/or data, etc. The computer readable program instructions may be configured to carry out functions of one or more aspects of the present invention.

Computer system 202 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 202. Examples, include, but are not limited to: microcode, device drivers, redundant processing units, external disk drive arrays, RAID systems, tape drives, and data archival storage systems, etc.

Computer system 202 may be operational with numerous other general purpose or special purpose computing system environments or configurations. Examples of well-known computing systems, environments, and/or configurations that may be suitable for use with computer system 202 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As noted, the depicted examples in FIGS. 1-2, and discussed above, are not meant to imply architectural limitations. For instance, data processing system 200 of FIG. 2 could also be a tablet computer, laptop computer, or other mobile device.

As noted initially, there are many different types of algorithms or approaches for load balancing. Disclosed herein is a data processing facility which further enhances one or more such underlying load balancing approaches by superimposing an intelligent process onto to the load balancer for, for instance, making sender status-aware load balancing decisions. In particular, the cognitive load balancing aspects disclosed herein may be used in combination with any conventional load balancer approach to further enhance workload processing within the data processing environment.

Generally stated, computer-implemented methods, systems and computer program products are disclosed herein to facilitate workload processing in a data processing environment which includes a sender system, a load balancer and a plurality of target resources. The sender system sends workloads to the load balancer and the load balancer distributes the workloads to the plurality of target resources for processing. In one or more aspects, enhanced intelligence is provided in association with, for instance, the load balancer beyond what is currently utilized in existing load balancer algorithms. While traditional load balancers may handle distributing workload for incoming connections to a pool of target resources, they typically lack full end-to-end knowledge of the communication and workload streams to make accurate decisions. In describing this issue, a sender system is a workload provider or device that initiates a connection to a central or distributed service, and a target resource is a device that accepts and processes the sender system data, for instance, in a standalone, clustered or distributed topology. Without such end-to-end knowledge, conventional load balancing algorithms may not be able to understand or adapt to the needs of a sender system when performance begins to suffer, or when the target resources are not balanced in real-time, for instance, due to improper refresh of the sender system's most appropriate target resource. This can cause issues such as one or more target resources assuming the majority of the processing load, sender system(s) being unable to connect and transmit data due to network or sender overload, data loss due to sender system being unable to process data in a timely manner, or one or more machines in a processing environment may cause the majority of a network and processing load to not be balanced appropriately. Current load balancers are unable to solve these issues.

Traditional load balancing approaches fall within a number of different types, including: simple (round robin, least number of connections, etc.), intelligent (balanced by geo, connection type, etc.) and load aware (communication with target resources to understand resources current load). One missing factor in the ability to understand end-to-end needs in a data processing environment, and truly enhance performance of workload processing is the sender system's workload status-related information (also referred to herein as sender status-related information). For instance, sender status-related information to be provided to the load balancer might include workload capacity issue information, such as any workload buffering capacity issue, which if known by the cognitive load balancer may be solved by (for instance) choosing a different target resource in a more distant load balancer pool (in a distributed topology), even if there is a longer network latency, depending on the processing delay in the current network pool. These and many other issues may be addressed by providing a load balancing facility which is sender system status-aware. Real-time analytics may be used, in one or more aspects, for the target resources, as well as the sender system(s) to, for instance, migrate one or more sender connections and workload processing to the most appropriate target resource.

By way of example, in one or more implementations, the network data traffic may be analyzed on a per sender system level, the target resource may provide information on the sender system's workload impact to the workload processing process (e.g., metric computation, database ingestion, etc.), and/or the sender system may provide information on the responsiveness of the target resource(s). This allows the load balancing facility to shift sender to target resource connections as necessary to better spread the load accurately and improve overall performance of the data processing environment. More particularly, this information may be used by the load balancing facility to understand and vector a sender system to the most appropriate target resources based on the workload and processing power. Initially, a target resource may be used in combination with the sender status-related information and at an immediate, or next appropriate time, the load balancing facility may switch one or more workloads of the sender system as described herein to balance the load, and performance within data processing environment.

In one or more embodiments, a load balancing facility such as disclosed herein may include a number of components, such as one or more sender systems that have a defined singular or list of target resources the sender will attempt to communicate with, which could be in the form of URIs, URLs, FQDNs, dotted decimal, etc., one or more target resources that can accept a connection from a sender system and process the sender's workload, and one or more analytics-based, cognitive load balancing facility, which can accept, forward and monitor end-to-end communications, workload and provide feedback to the sender system(s). The workload facility may be associated with or an extension of one or more conventional load balancer algorithms, with, for instance, the facility or extension being implemented by machine logic associated with in one or more embodiments the load balancer.

During operation, the load balancing facility accepts and balances load to the appropriate target resources, and during this process, the cognitive load balancing facility disclosed herein queries the sender system(s) and optimizes the workload flow process between the sender system and target resources. The communications between the load balancing facility and the sender system may include determining the network load and performance from the sender system to one or more target resources, ascertaining the performance of the workload processing at a particular target resource, determining the perceived performance in workload processing as viewed from the sender system, etc.

Using such information, the load balancing facility may assign or vector a sender system to a particular resource target, for instance, when in a single load balancer arrangement, or update the arrangement, or update the sender system's target resource list when in a multi-load balancer arrangement. Simple examples of this may include determining that while target resource A is the least loaded resource, it has poor input/output performance, and is a poor candidate for a particular sender system with a large workload upload. As another example, while a first load balancer is a closest physical connection point, the performance of its connection back to the target resource(s) is overloaded, so a second load balancer further away may actually be a better connection/performance point for the sender system. The load balancing facility disclosed herein may be based on the power of analytics to understand, vector and balance load within a data processing environment based on performance as seen, in one or more aspects, by the sender system in particular, and more generally by all entities involved in the process.

Advantageously, in one or more aspects, an API may be provided to control the operation of the overall balance solution (e.g., adding and deleting target resources, setting minimum and maximum thresholds, etc.), an API may be provided to consume metrics and information that the facility collects in order to understand the performance and operation of one or more components within a data processing environment (e.g., utilization, which sender system produces the highest workload, etc.), and logic may be provided to generate events (such as SNMP, emails, SMS, or other programmatic types) when static or predicted thresholds may be violated.

Figure 3:
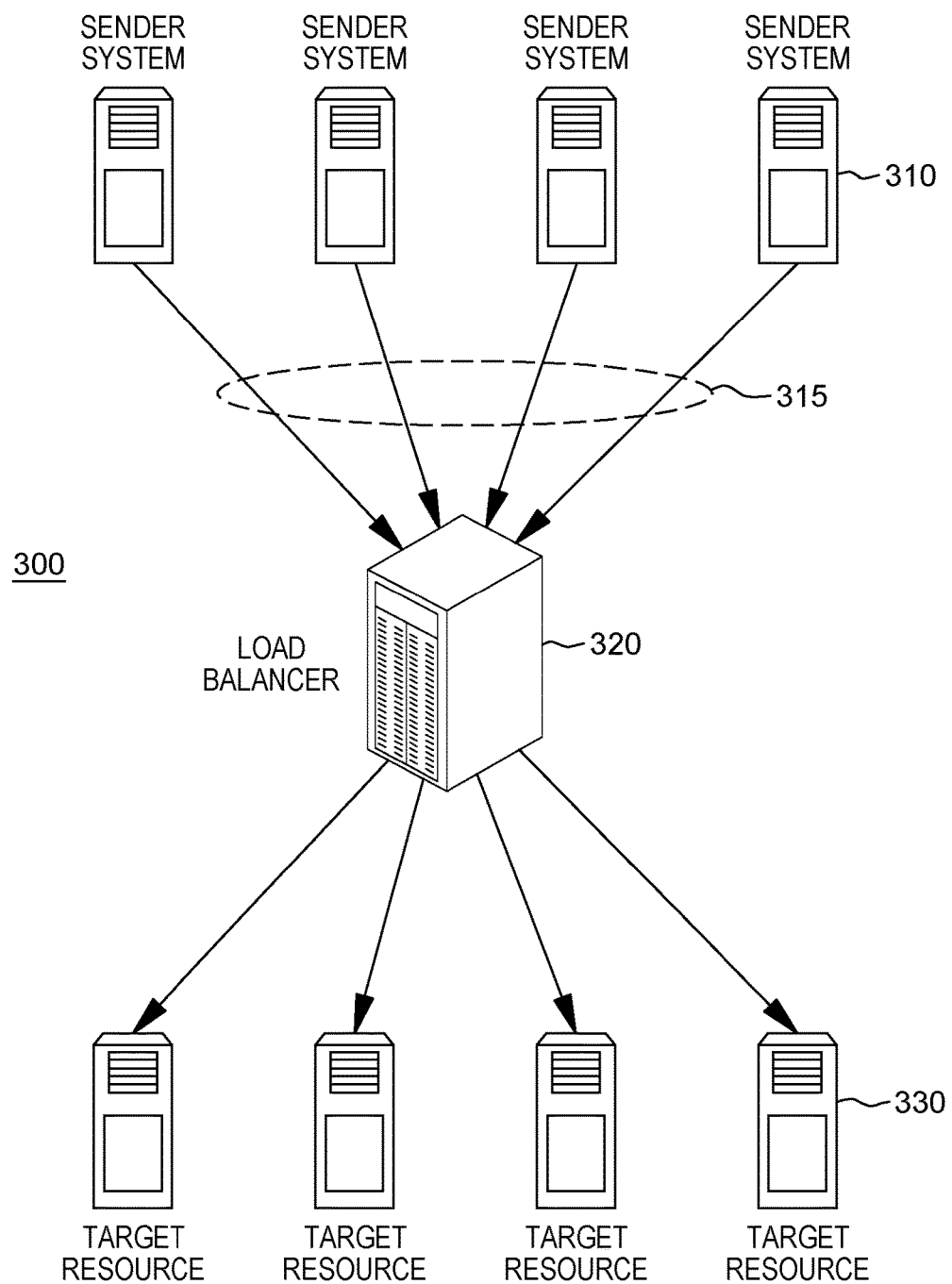
FIG. 3 depicts another embodiment of a data processing environment within which may benefit from sender system status-aware load balancing, in accordance with one or more aspects of the present invention.

By way of further example, FIG. 3 depicts a data processing environment 300 which includes one or more sender systems 310, a load balancer 320, and pooled target resources 330. In one or more aspects, a sender system 310 sends workloads, such as across a network 315, to load balancer 320 for distribution to the plurality of target resources 330 for processing. As with any load balancing solution, the data processing environment 300 depicts three traditional components, however, in one or more aspects of the present invention, additional intelligence is added such as a self-learning capability or a cognitive capability in the form of a load balancing facility is provided, which, in one or more embodiments, may be associated with the load balancer or load balancing algorithm. This cognitive load balancing facility is also referred to herein as a cognitive load balancer. Sender system 310 may be one or more systems, devices such as general computers, Internet of Things devices, fixed function devices, etc. that send workload data to a target resource (i.e., a target system, computer, device, machine, etc.). Conventionally, the load balancer is a transparent device to the sender system, that is, the sender might not know of the load balancer's existence in the dataflow. A traditional load balancer may use a virtual IP and "front end" the target resources to intercept and balance the load of incoming workload (requests and data) across multiple target resources. The target resources may be target devices that can range from, for instance, databases, compute devices, web servers, to any device that either receives, stores and/or processes and sends a response back to the sender system. Collectively these functions are referred to herein as "processing" the workload.

As noted briefly above, there are a number of problems with currently load balancing algorithms that are addressed by the sender status-aware load balancing facility disclosed herein. In current load balancing solutions, there is no sender communication beyond the received workload, and thus, no end-to-end communication and intelligence, that can ensure data is not lost. In many cases today, the sender system or machine has either a finite amount of buffer space, or can only send additional data when a response is sent by one of the target resources (e.g., an acknowledgement), where it is the processing of a workload (e.g., packet of data) that allows the source system to continue to send additional workload. This can lead to a number of error conditions, such as: one or more of the sender systems cannot send data fast enough due to a temporary condition causing excessive workload data (e.g., bulk load), one or more of the source systems cannot send data fast enough due to an error condition causing an excessive "flood" of data to be sent (e.g., events storm), one of more of the source systems cannot send data fast enough due to network errors or conditions (e.g., high bit error rate or all senders send above normal data volumes that exceed the incoming network connections capabilities of the load balancer(s)) and one or more of the sender systems cannot receive the acknowledgement or response from the target resource due to an overload of data being sent in from the sender(s), and a lack of processing/network capacity. In any of the above conditions, the greatest risk is that the sender system will either run out of buffer space and/or discard data since it cannot process the data or send the workload prior to the buffer being exhausted.

Figure 4:
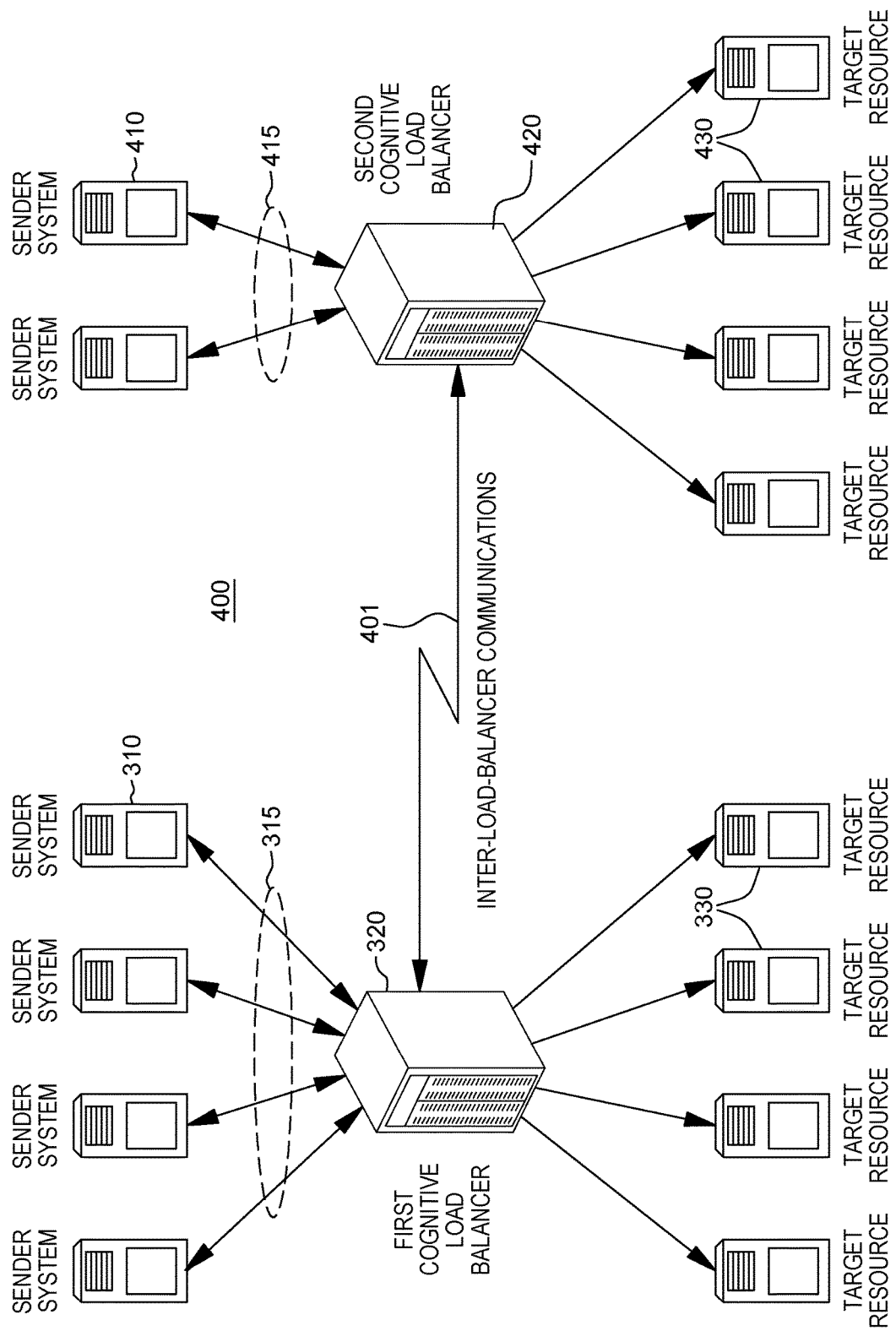
FIG. 4 depicts a block diagram of another data processing environment within which sender system status-aware load balancing may be implemented, in accordance with one or more aspects of the present invention.

FIG. 4 depicts another embodiment of a data processing environment, generally denoted 400, in accordance with one or more aspects of the present invention. Data processing 400 represents an example of a distributed processing environment wherein multiple cognitive load balancers may communicate 401 in order to facilitate intelligent load balancing as described further herein. By way of example, data processing environment 400 includes on the left side of the diagram the data processing environment of FIG. 3, wherein the load balancer 320 is now a first cognitive load balancer, and the environment further includes a second cognitive load balancer 420. Intelligence or logic is provided in association with the first and second cognitive load balancers 320, 420 to allow inter-load-balancer communications. As illustrated, second cognitive load balancer 420 may receive workloads from one or more sender systems 410, such as across a network 415, and distribute the workload to a plurality of pooled target resources 430. In one or more implementations, the networks 315, 415 may be the same or different networks meaning (in part) that workloads from different sender systems 310, 410 may be received at different rates by their respective target resources 330, 430.

Figure 5:
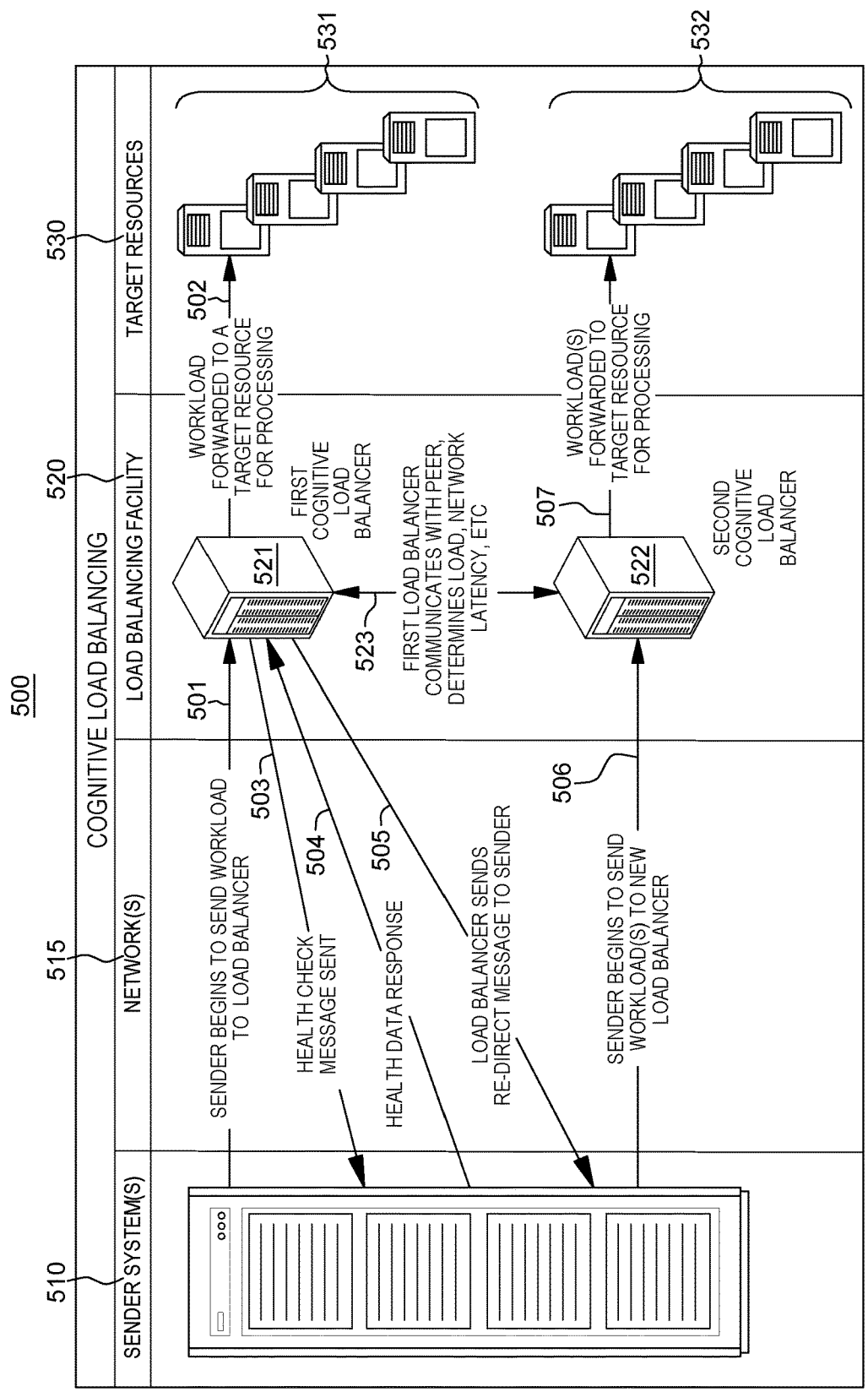
FIG. 5 is an illustration of one processing embodiment of sender system status-aware load balancing, in accordance with one or more aspects of the present invention.

FIG. 5 depicts one embodiment of sender system status-aware load balancing, in accordance with one or more aspects of the present invention. The solution disclosed herein is to add a cognitive load balancing facility which includes intelligence, self-learning and/or higher level protocols to the underlying load balance process to allow the facility to act as a data flow monitor and provide the ability to vector the sender systems (e.g., source machines) to a load balancer which can handle the senders workload based on multiple criteria, including, for instance: the "health" of one or more of the sender systems, including the sender system's buffer space capacity, the network transition time to process the sender's workload, computed buffer exhaustion time, as well as the ability of one or more load balancer peers, and their network location and/or transit time to the current load balancer connection (e.g., what is the additional network transition time if the sender is revectored to a different load balancer), and the ability of target resources at the other load balancer to handle the additional workload. Using communication with one or more load balancer peers, the facility may evaluate target resources and their performance (e.g., peer load balancer may communicate that the balancer has a target resource that is responding in 20 milliseconds versus the local target resource which may be responding in 200 milliseconds).

Referring more specifically to FIG. 5, in the cognitive load balancing process 500 a data processing environment such as depicted in FIG. 4 is assumed wherein there are one or more sender systems 510, which send workloads across one or more networks 515 to a load balancing facility 520, which includes in this example multiple cognitive load balancers, including a first cognitive load balancer 521 and a second cognitive load balancer 522, and target resources 530, which are shown to include a first plurality of target resources 531 associated with first cognitive load balancer 521 and a second plurality of target resources 532 associated with second cognitive load balancer 522. Note that this processing embodiment is provided as one example only of the inventive aspects disclosed herein. In one or more other embodiments, additional cognitive load balancers may be part of the load balancing facility, or only a single cognitive load balancer may be a part of the load balancing facility.

As illustrated, in one or more implementations, the sender system beings to send workloads (requests, data, etc.) to a load balancer 501, which in this example is first cognitive load balancer 521. The workload is forwarded or distributed to a target resource for processing 502 by, in this example, first cognitive load balancer 521, with the target resource being a part of the first plurality of target resources 531 associated with first cognitive load balancer 521. While processing workloads for sender system(s) 510, the load balancing facility 520 sends a health check message 503 to the sender system(s). Note that in an alternate embodiment, the health check message could be initiated by the sender system, with the sender system periodically providing the load balancing facility 520 with health updates and/or providing health updates upon occurrence of a threshold condition. By way of example, the sender system may determine that it will run out of workload buffering capacity within the next five minutes, and the health data response 504 to load balancing facility 520 may relay this information to the load balancing facility. When the load balancing facility, and in particular, first cognitive load balancer 521 receives this information it may communicate with one or more of its peer load balancers to determine if the one or more peers have sufficient capacity to handle additional workload 523. The determined information may include availability of a peer load balancer, a check with one or more target resources of that load balancer to determine network delay that would be introduced by redirecting the sender system, and, for instance, a determination whether vectoring the sender system to a new load balancer would ensure that it would not fail and/or loose data.

Based on this information, the load balancing facility 520 may decide that the sender system 510 should be reassigned or revectored 505 (at least until further notice) to the second cognitive load balancer 522 until, for instance, the workload capacity issue is resolved (e.g., the sender's workload buffer clears, a network issue such as a bad segment and/or link is corrected, etc.) and then the sender system may be returned to the original (e.g., geographically closer) cognitive load balancer. Responsive to receiving the redirected message, the sender system beings to send one or more workloads to the new load balancer 506, and the second cognitive load balancer 532 distributes the one or more workloads by forwarding the workloads to target resources for processing 507. Note that in one or more implementations, the forwarding or distributing of workloads from the respective load balancers to their pooled target resources may be using, at least in part, one or more conventional load balancing algorithms, for instance, such as those mentioned herein. In operation, the sender system is redirected to the new load balancer and continues to send data until it is told by the load balancing facility that to revector back to the original home or normal load balancer 521. This can be done computationally, for instance, the load balancer peers may decide the issue is resolved, or potentially human action could force this if a problem and/or issue must be resolved. Advantageously, by reassigning the sender system to a peer workload balancer, data flows through to one or more target resources and the workload capacity issue at the sender system begins to be resolved (e.g., workload buffers may drain) without loss of data.

Figure 6:
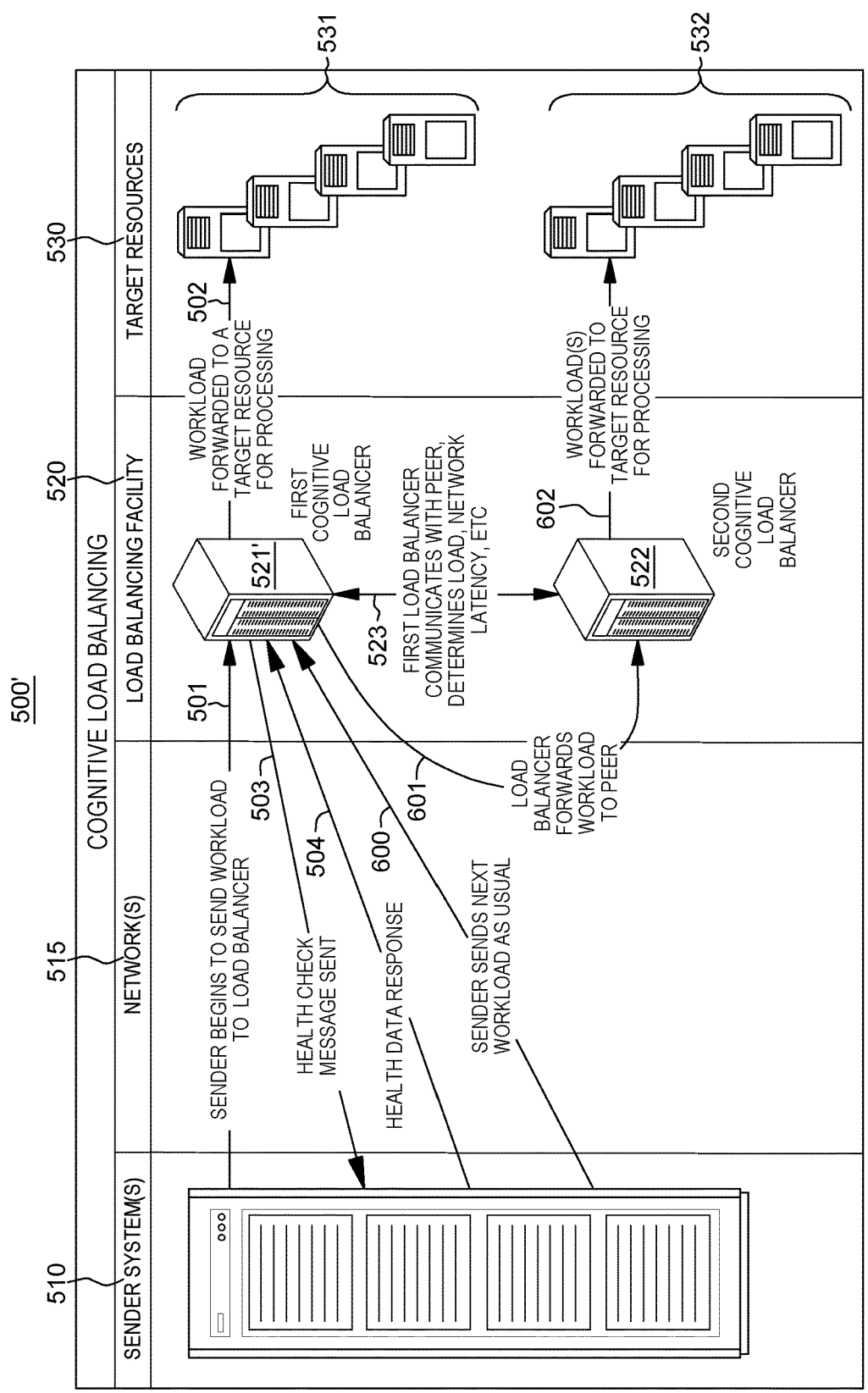
FIG. 6 is an illustration of another processing embodiment of sender system status-aware load balancing, in accordance with one or more aspects of the present invention.

In FIG. 6, an alternate processing embodiment for sender system status-aware load balancing is presented. This cognitive load balancing approach 500' is similar to cognitive load balancing 500 of FIG. 5, with the exception being that rather than redirecting the sender system 510 to second cognitive load balancer 522, the first cognitive load balancer 521' continues to receive the sender sent workload 600 and functions as a proxy by forwarding the sender's received workload 601 to second cognitive load balancer 522, which then forwards the workload to one or more target resources for processing 602. Any communication back to the sender system would be through both peer load balancers 521', 522, in this embodiment, since the first cognitive load balancer is functioning as a proxy for the second cognitive load balancer.

Those skilled in the art will note that there are numerous aspects to the present invention. For instance, one or more aspects involve the use of a communication channel between peer (e.g., same function) load balancers, such that the peer load balancers may understand and share the health and utilization of their sender systems and target resources. Further, one or more aspects may involve the use of a "health" check, such as a health check API, and communications to allow a sender system to notify a load balancing facility that the sender system, for instance, will or has reached an error condition, that is, is experiencing or will soon experience a workload capacity issue. Further, in one or more aspects, an intelligent facility is provided herein to track, for instance, network workflow, network error rates, network congestion, and/or target performance. Based on this, the facility may determine where to vector a sender system that might be in trouble in order to minimize loss of data at the sender system. Further, in one or more aspects, the load balancing facility described may include capabilities such as the ability to temporarily increase available buffer space if it would not impact the sender system and/or if it is allowed via settings.

In addition, or stated otherwise, one or more aspects of the present invention may involve the use of a communication with the sender system (or machine) to understand how much workload is unable to be sent due, for instance, to one or more target resources not being able to consume the workload fast enough (e.g., due to a lack of resources), or due to network capacity or other issues within the network link such as bit errors or throttling issues. Further, disclosed herein is the use of cross domain communication to allow load balancers to shift data senders to an alternate load balancer if the other load balancer is better suited to handle the workload. Further, the use of cross domain communication and a cognitive evaluation is provided on where to send workload so that the load may best be processed. For instance, the current target may be in the US, but the best load balancer to handle the data may be in Japan, even considering the additional network transit time. Still further, disclosed herein is the use of a cognitive load balancing facility or system that is able to evaluate the entire data traffic and process workload so that usage, utilization and volume is analyzed in real time, decisions are made and data can be used in both design and operations capacity.

In one or more further aspects, the load balancing facility or system disclosed herein receives sender system buffering information indicative of data buffering capabilities of the sender system providing workload to the load balancer, and defining an initial plurality of target resources that are available for performing the sender's workload. During processing, a first additional resource may be selected from a plurality of additional resources, such as associated with a second load balancer facility, where the plurality of additional resources each include a respective delay characteristic. The selecting additional resources may be responsive to a capacity condition at the machine logic, such as at the first load balancer. The additional resource may be added to the initial plurality of target resources to form a new plurality of target resources for distributing the workloads to the new plurality of target resources based on the sender system buffering information.

One or more embodiments of the present invention may include one or more of the following features, operations, characteristics and/or advantages: (i) a set of machine logic to understand the entire end-to-end dataflow; and (ii) using a set of machine logic based rules to have a source (or sender) moved to another target if the target cannot handle the load; (iii) use of machine logic rules to (dynamically), in a load balancer, automatically select workload sources for connection to available workload targets; and/or (iv) select, automatically by machine logic of a load balancer, workload targets to handle the workload sources (or senders) selected by the load balancer on an ongoing basis.

Generally stated, disclosed herein are computer-implemented methods, systems and computer program products for facilitating workflow processing in a data processing environment. For instance, the computer-implemented methods may include facilitating workload processing in data processing environment including a sender system, a load balancer and a plurality of target resources. The sender system sends workloads to the load balancer and the load balancer distributes the workloads to the plurality of target resources for processing. Facilitating workload processing may include receiving, by the load balancer, sender status-related information indicative of a workload capacity issue from the sender system's view related, at least in part, to the sending of the workloads to the load balancer, and distributing, by the workload balancer, one or more workloads of the sender system workloads to one or more target resources of the plurality of target resources in a manner based, at least in part, upon the received sender status-related information.

In one or more implementations, the sender status-related information is indicative of a workload processing issue at the sender system related, at least in part, to the sending of the workloads to the load balancer. In one or more further implementations, the sender status-related information may be indicative of a workload buffering capacity issue at the sender system. Further, in one or more embodiments, the sender status-related information may be indicative of a current average response time experienced by the sender system for workloads sent to the load balancer and distributed to the plurality of target resources. Still further, in one or more embodiments, the sender status-related information may include a time projection to when the sender system will use up buffering capacity for workload being sent to the load balancer. In one or more embodiments, facilitating workload processing may include requesting, by the load balancer, that the sender system provide the load balancer with the sender status-related information.

In one or more embodiments, the load balancer may be a first load balancer, and the plurality of target resources may be a first plurality of target resources, and the data processing environment may further include a second load balancer and a second plurality of target resources to which the second load balancer distributes workloads. The facilitating data processing may further include ascertained by the first load balancer workload capacity-related information from the second load balancer and based, at least in part, upon the ascertaining workload capacity-related information from the second load balancer determine to offload one or more workloads of the sender system to the second load balancer. For instance, the facilitating workload processing may include redirecting, by the first load balancer, the sender system from the first load balancer to the second load balancer to process one or more workloads of the workloads of the sender system based, at least in part, upon the received sender status-related information and the workload capacity-related information received from the second load balancer. In one or more other embodiments, the facilitating workload processing may include forwarding, by the first load balancer, one or more workloads of the workloads of the sender system to the second load balancer for distribution to one or more target resources of the second plurality of target resources based, at least in part, on the received sender status-related information and the workload capacity-related information received from the second load balancer.

In one or more further aspects, a computer-implemented method, system and computer program product are provided which include facilitating workload processing in a data processing environment including a sender system, a load balancer, and target resources. The sender system sends workloads to the load balancer and the load balancer distributes the workloads to the target resources. The facilitating workload processing may include: defining an initial plurality of target resources available for processing the workloads; determining by machine logic that a capacity condition exists at the sender system; and responsive to the determination of the capacity condition at the sender system, selecting by the machine logic an additional target resource from the plurality of additional target resources, with each additional target resource respectively having an associated network delay characteristic from the sender system, and the selection being based, at least in part, upon the respective network delay characteristic of the additional target resource.

In one or more implementations, the facilitating workload processing may further include adding the additional target resource to the initial plurality of target resources to form a new plurality of target resources available for processing the workloads of the sender system.

In one or more embodiments, the capacity condition at the sender system may be a workload capacity issue at the sender system related, at least in part, to the sending of the workloads to the load balancer. For instance, the capacity condition at the sender system may include a workload processing issue at the sender system related, at least in part, to the sending of the workloads to the workload balancer. Alternatively, the capacity condition at the sender system may be a workload buffering capacity issue at the sender system. In one or more implementations, the machine logic may be associated with the load balancer.

In one or more embodiments, the load balancer may be a first load balancer, and the data processing environment may further include a second load balancer, with the plurality of additional target resources being associated with the second load balancer, and the selecting of the additional target resources being via, at least in part, the first load balancer communicating with the second load balancer.

As noted, in one or more implementations, systems for facilitating workload processing are provided herein which include a memory, and a processing circuit communicatively coupled with a memory, wherein the systems perform one or more methods such as outlined above in connection with the computer-implemented methods.

Further, as noted, computer program products for facilitating workload processing are also provided herein. The computer program products each include a computer readable storage medium readable by a processing circuit and storing instructions for execution by the processing circuit for performing a method, such as one or more methods of the computer-implemented methods discussed herein.

By way of further example, disclosed herein are a computer implemented method, system and computer program product for use with a source or sender system, a load balancer and a plurality of target resources. The source system sends workloads to the load balancer and the load balancer distributes the workloads among and between the plurality of target resources. The method may include receiving, by the load balancer, sender system buffering information indicative of data buffering capabilities of the sender system, and distributing, by the load balancer, the workloads among and between the target resources in a manner based, at least in part, upon the sender system buffering information. In one or more further embodiments, the sender system buffering information may include at least one of: volatile buffering memory capacity and/or non-volatile buffering storage capacity.

In one or more further embodiments, a computer-implemented method, system and computer program product are provided for use with a source or sender system, a load balancer and a plurality of target resources. The sender system sends workloads to the load balancer and the load balancer distributes the workloads among and between the plurality target resources. The computer-implemented method may include defining an initial plurality of target resources that are available for performing workloads, and determining, by machine logic, that a capacity condition exists. Responsive to the determination of the capacity condition, the method includes selecting, by the machine logic, a first additional resource from a plurality of additional resources, with each additional resource respectfully having an associated delay characteristic(s), and with the selection being based, at least in part, upon the delay characteristic(s). In enhanced embodiments, the first additional resource may be added to the initial plurality of target resources to form a new plurality of target resources. Further, the method may include distributing, by the load balancer, the workloads to the new plurality of target resources in a manner based, at least in part, upon the sender's buffering information.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
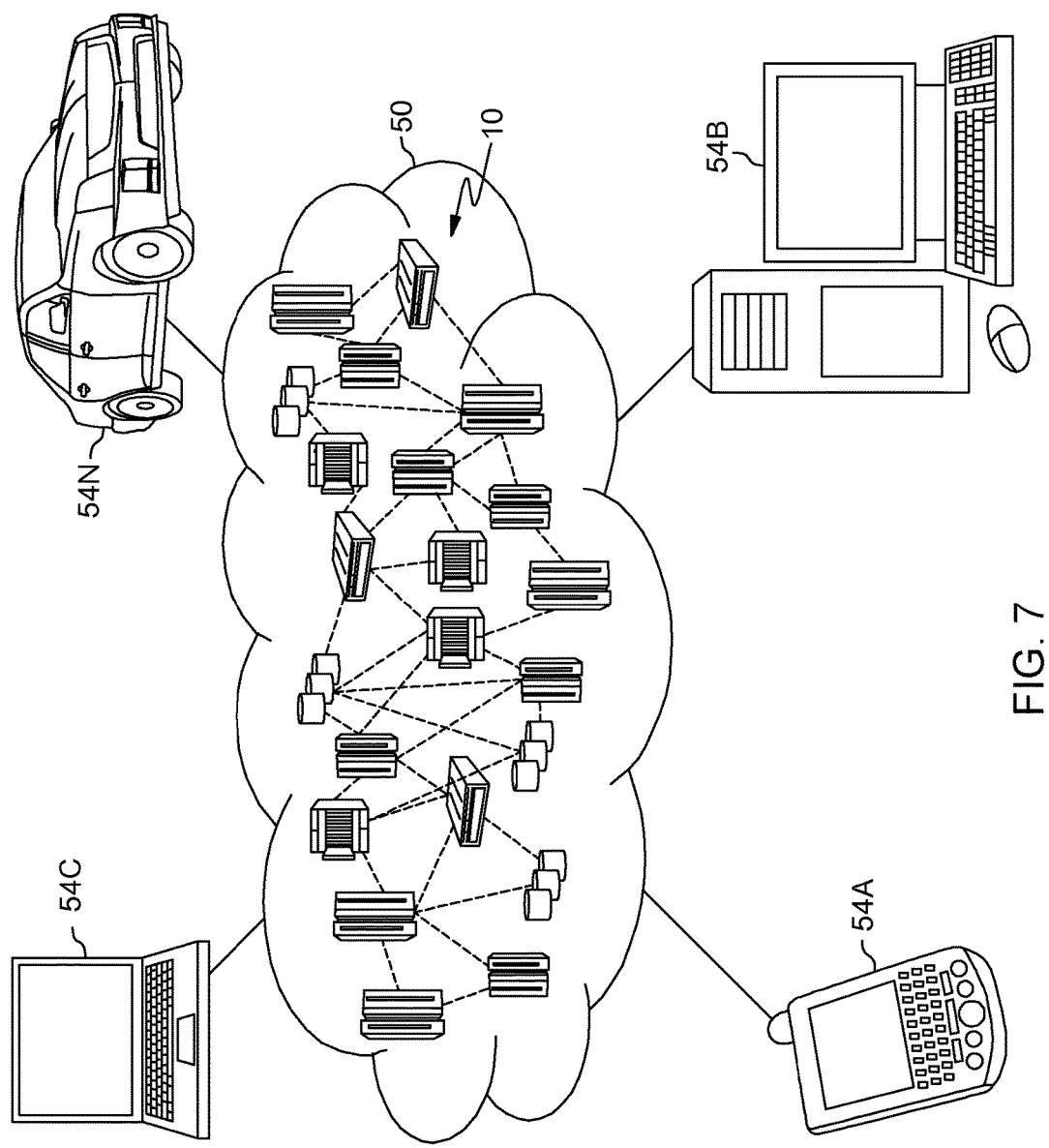
FIG. 7 depicts one embodiment of a cloud-computing environment which may facilitate implementing, or be used in association with, one or more aspects of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 27 are intended to be illustrative only and that computing nodes 10 and cloud computing environment 50 can communicate with any type of computerized device over any type of network and/or network addressable connection (e.g., using a web browser).

Figure 8:
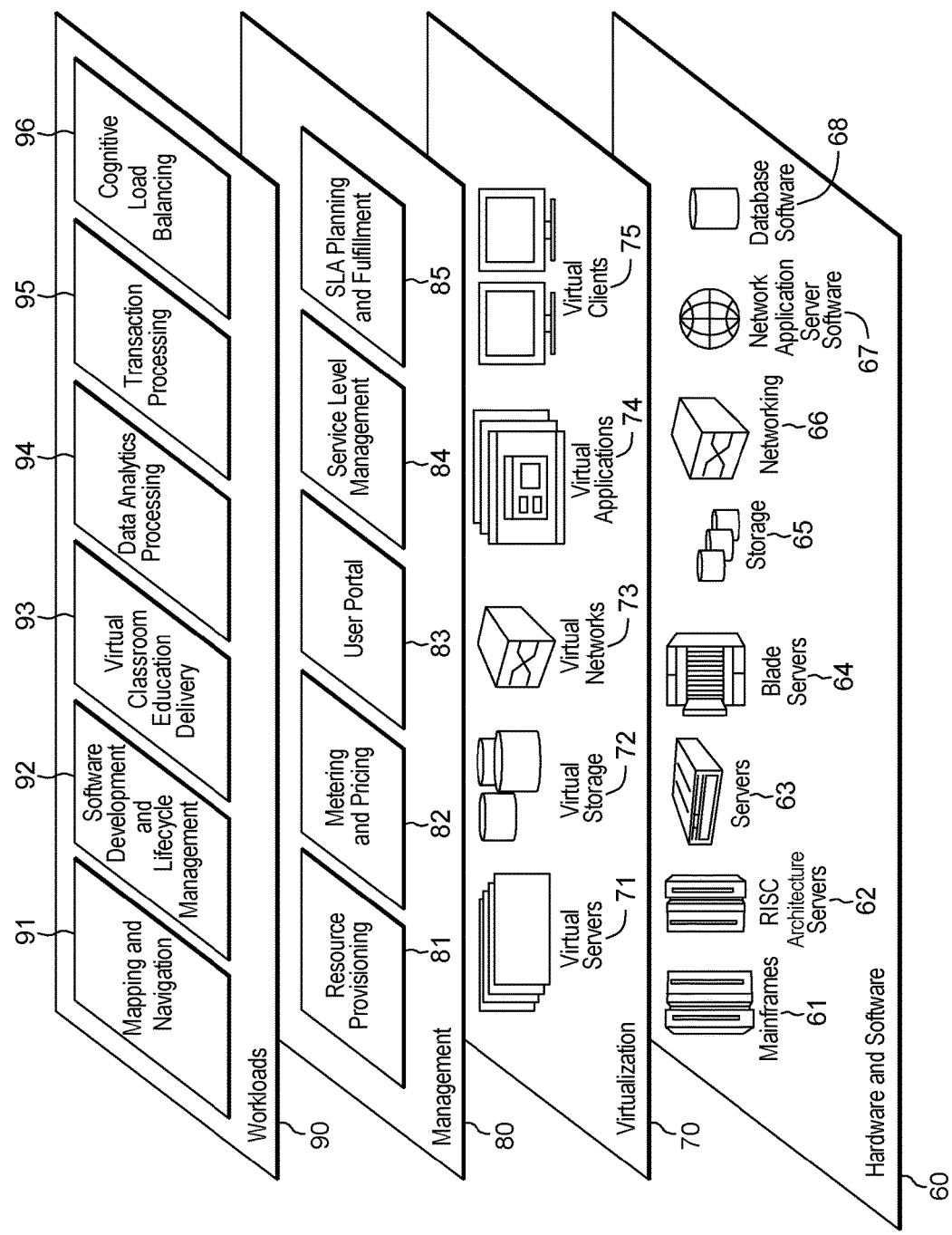
FIG. 8 depicts an example of extraction model layers, which may facilitate implementing cognitive load balancing, in accordance with one or more aspects of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive load balancing processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   facilitating workload processing in a data processing environment including a sender system, a load balancer and a plurality of target resources, the sender system sending workloads to the load balancer and the load balancer distributing the workloads to the plurality of target resources for processing, the facilitating workload processing comprising:
receiving, by the load balancer, sender status-related information indicative of a workload capacity issue from the sender system view related, at least in part, to the sending of the workloads to the load balancer; and
distributing, by the workload balancer, one or more workloads of the sender system workloads to one or more target resources of the plurality of target resources in a manner based, at least in part, upon the received sender status-related information, wherein the sender status-related information is indicative of a workload processing issue at the sender system related, at least in part, to the sending of the workloads to the load balancer.

2. The computer-implemented method of claim 1, wherein the sender status-related information is indicative of a workload buffering capacity issue at the sender system.

3. The computer-implemented method of claim 1, wherein the sender status-related information is indicative of a current average response time experienced by the sender system for workload sent to the load balancer and distributed to the plurality of target resources.

4. The computer-implemented method of claim 1, wherein the sender status-related information includes a time projection to when the sender system will use up buffering capacity for workload being sent to the load balancer.

5. The computer-implemented method of claim 1, wherein the facilitating workload processing further includes requesting, by the load balancer, that the sender system provide the load balancer with the sender status-related information.

6. The computer-implemented method of claim 1, wherein the load balancer is a first load balancer, and the plurality of target resources are a first plurality of target resources, and wherein the data processing environment further comprises a second load balancer and a second plurality of target resources to which the second load balancer distributes workloads, and wherein the facilitating data processing further comprises ascertaining by the first load balancer workload capacity-related information from the second load balancer, and based, at least in part, upon the ascertained workload capacity-related information from the second load balancer determining by the first load balancer to offload one or more workloads of the sender system to the second load balancer.

7. The computer-implemented method of claim 6, wherein the facilitating workload processing further comprises redirecting, by the first load balancer, the sender system from the first load balancer to the second load balancer to process one or more workloads of the workloads of the sender system based, at least in part, upon the received sender status-related information, and the workload capacity-related information received from the second load balancer.

8. The computer-implemented method of claim 6, wherein the facilitating workload processing further includes forwarding, by the first load balancer, one or more workloads of the workloads of the sender system to the second load balancer for distribution to one or more target resources of the second plurality of target resources based, at least in part, upon the received sender status-related information, and workload capacity-related information received from the second load balancer.

9. A computer-implemented method comprising:
facilitating workload processing in a data processing environment including a sender system, a load balancer, and target resources, the sender system sending workloads to the load balancer and the load balancer distributing the workloads to the target resources, the facilitating workload processing comprising:
defining an initial plurality of target resources available for processing the workloads;
determining, by machine logic, that a capacity condition exists at the sender system; and
responsive to the determination of the capacity condition at the sender system, selecting by the machine logic an additional target resource from a plurality of additional target resources, with each additional target resource respectively having an associated network delay characteristic from the sender system, and the selection being based, at least in part, upon the respective network delay characteristic of the additional target resource.

10. The computer-implemented method of claim 9, wherein the facilitating workload processing further comprises adding the additional target resource to the initial plurality of target resources to form a new plurality of target resources available for processing the workloads of the sender system.

11. The computer-implemented method of claim 9, wherein the capacity condition at the sender system is a workload capacity issue at the sender system related, at least in part, to the sending of the workloads to the load balancer.

12. The computer-implemented method of claim 11, wherein the capacity condition at the sender system comprises a workload processing issue at the sender system related, at least in part, to the sending of the workloads to the workload balancer.

13. The computer-implemented method of claim 11, wherein the capacity condition at the sender system is a workload buffering capacity issue at the sender system.

14. The computer-implemented method of claim 11, wherein the machine logic is associated with the load balancer.

15. The computer-implemented method of claim 14, wherein the load balancer is a first load balancer, and wherein the data processing environment further comprises a second load balancer, the plurality of additional target resources being associated with the second load balancer, and the selecting of the additional target resource is via, at least in part, the first load balancer communicating with the second load balancer.

16. A system for facilitating workload processing, the system comprising:
a memory; and
a processing circuit communicatively coupled with a memory, wherein the system performs a method comprising:
facilitating workload processing in a data processing environment including a sender system, a load balancer and a plurality of target resources, the sender system sending workloads to the load balancer and the load balancer distributing the workloads to the plurality of target resources for processing, the facilitating workload processing comprising:
receiving, by the load balancer, sender status-related information indicative of a workload capacity issue from the sender system view related, at least in part, to the sending of the workloads to the load balancer; and
distributing, by the workload balancer, one or more workloads of the sender system workloads to one or more target resources of the plurality of target resources in a manner based, at least in part, upon the received sender status-related information, wherein the sender status-related information is indicative of a workload processing issue at the sender system related, at least in part, to the sending of the workloads to the load balancer.

17. The system of claim 16, wherein the sender status-related information is indicative of a workload buffering capacity issue at the sender system.

18. The system of claim 16, wherein the sender status-related information is indicative of a current average response time experienced by the sender system for workload sent to the load balancer and distributed to the plurality of target resources.

\* \* \* \* \*